Figure 1:
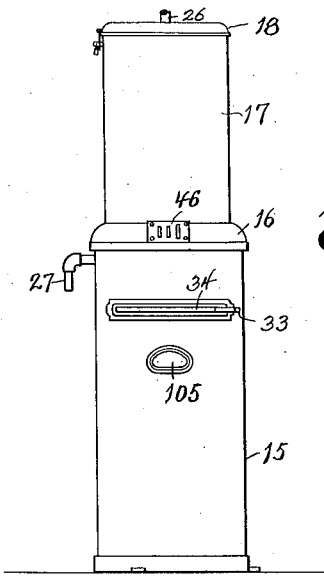

A. H. SAGE & F. E. MITCHELL.
LIQUID VENDING MACHINE.
APPLICATION FILED FEB. 23, 1907.

936,365.

Patented Oct. 12, 1909.
7 SHEETS—SHEET 1.

Witnesses:
C. H. Keeney,
Anna F. Schmidtbauer

Inventors:
Frank E. Mitchell &
Adolphus H. Sage
By Benedict, Morsell & Caldwell,
Attorneys.

A. H. SAGE & F. E. MITCHELL.
LIQUID VENDING MACHINE.
APPLICATION FILED FEB. 23, 1907.

936,365.

Patented Oct. 12, 1909.
7 SHEETS—SHEET 2.

A. H. SAGE & F. E. MITCHELL.
LIQUID VENDING MACHINE.
APPLICATION FILED FEB. 23, 1907.

936,365.

Patented Oct. 12, 1909.
7 SHEETS—SHEET 3.

Witnesses.
Inventors
Frank E. Mitchell +
Adolphus H. Sage
By Benedict, Morsell + Caldwell
Attorneys.

A. H. SAGE & F. E. MITCHELL.
LIQUID VENDING MACHINE.
APPLICATION FILED FEB. 23, 1907.

936,365.

Patented Oct. 12, 1909.
7 SHEETS—SHEET 5.

Witnesses.

Inventors.
Frank E. Mitchell &
Adolphus H. Sage,
By Benedict, Morsell & Caldwell.
Attorneys.

A. H. SAGE & F. E. MITCHELL.
LIQUID VENDING MACHINE.
APPLICATION FILED FEB. 23, 1907.

936,365.

Patented Oct. 12, 1909.
7 SHEETS—SHEET 7.

Witnesses.
Inventors.
Frank E. Mitchell &
Adolphus H. Sage
By Benedict, Morsell & Caldwell
Attorneys.

UNITED STATES PATENT OFFICE.

ADOLPHUS H. SAGE AND FRANK E. MITCHELL, OF OSHKOSH, WISCONSIN, ASSIGNORS TO LIQUID VENDING MACHINE COMPANY, OF OSHKOSH, WISCONSIN, A CORPORATION OF WISCONSIN.

LIQUID-VENDING MACHINE.

936,365.     Specification of Letters Patent.     Patented Oct. 12, 1909.

Application filed February 23, 1907. Serial No. 358,810.

*To all whom it may concern:*

Be it known that we, ADOLPHUS H. SAGE and FRANK E. MITCHELL, residing in Oshkosh, in the county of Winnebago and State of Wisconsin, have invented new and useful Improvements in Liquid-Vending Machines, of which the following is a description, reference being had to the accompanying drawings, which are a part of this specification.

This invention has for its object to provide automatic coin-controlled mechanism for measuring and dispensing liquids.

Another object of this invention is to provide a liquid vending machine especially designed for dispensing liquid fuels, such as gasolene for automobile or motor boat supply, and which will be normally entirely free from such combustible fluid except for its pipe connection with a distant supply tank.

Another object of this invention is to provide a liquid vending machine capable of being actuated by coins of different value and adapted to vary the quantity of liquid dispensed according to the value of the coin deposited.

Another object of this invention is to provide a liquid vending machine with an automatic mechanism adjusted by the coin deposited, for changing the position of a valve operating means so as to stop the inflow of liquid to the measuring receptacle at higher or lower levels and thus accurately proportion the quantity of liquid dispensed to the value of the coin deposited.

Another object of this invention is to provide a liquid vending machine having a normally locked valve controlling means adapted to be unlocked by the deposit of a coin and serving in its movements to vary the position of a measuring device in such a manner that it will measure a quantity of liquid proportionate to the value of the coin deposited.

Another object of this invention is to return to the depositor all coins which do not effect the operation of the machine.

Another object of this invention is to provide a measuring device for liquid vending machines which will be capable of ready adjustment to compensate for the fluctuation in price of the liquid dispensed.

Another object of this invention is to provide a liquid vending machine with a combined supply and discharge valve which will be proof against leakage.

With the above and other objects in view the invention consists in the liquid vending machine as herein claimed, its parts and combinations of parts and all equivalents.

Referring to the accompanying drawings in which like characters of reference indicate the same parts in the several views:—

Figure 6:
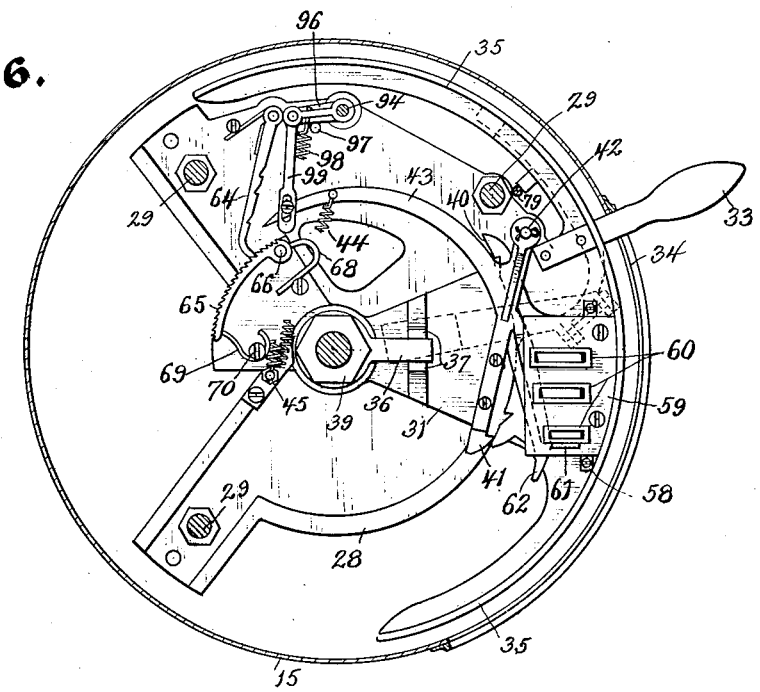
Figure 2:
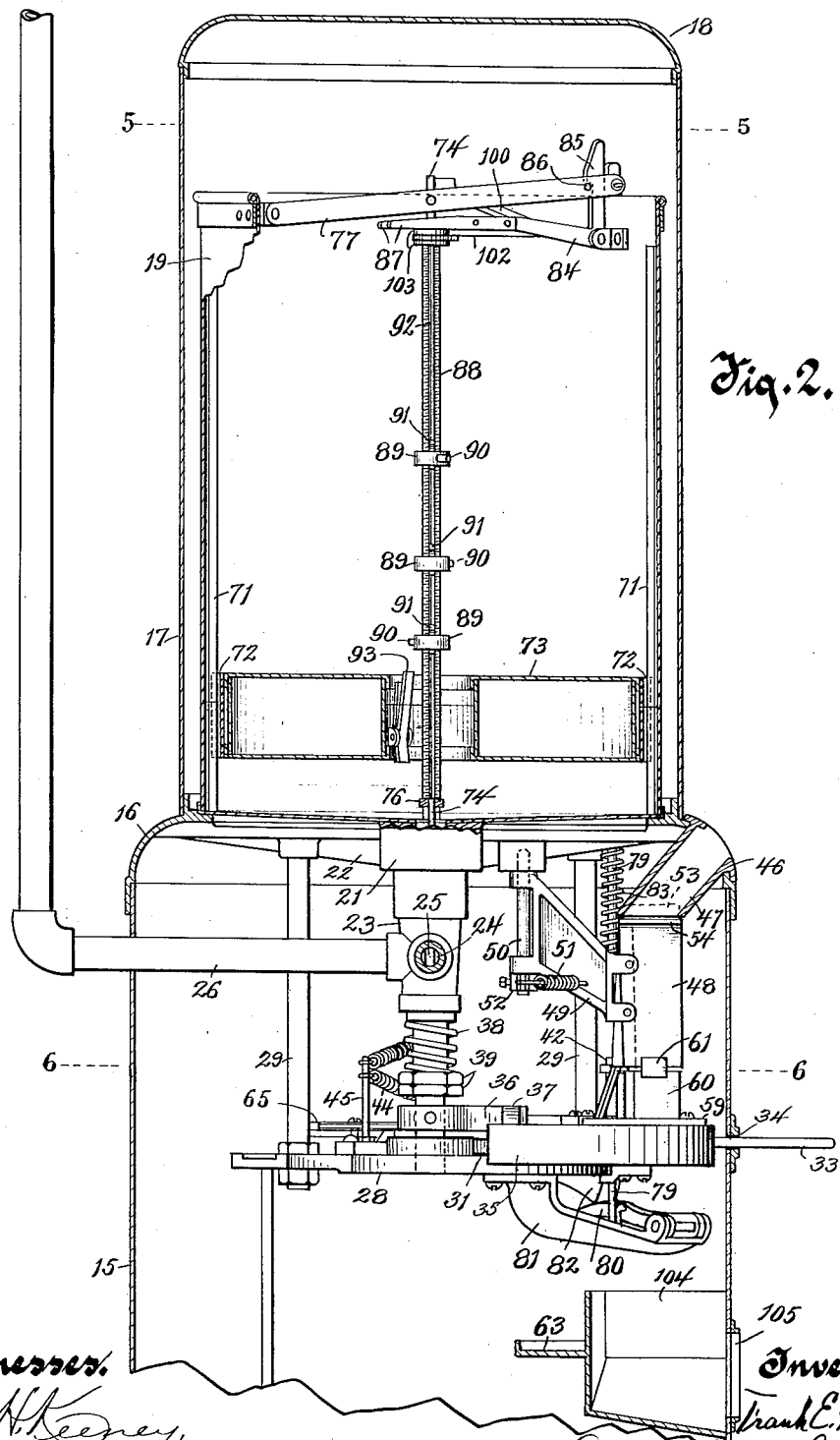
Figure 3:
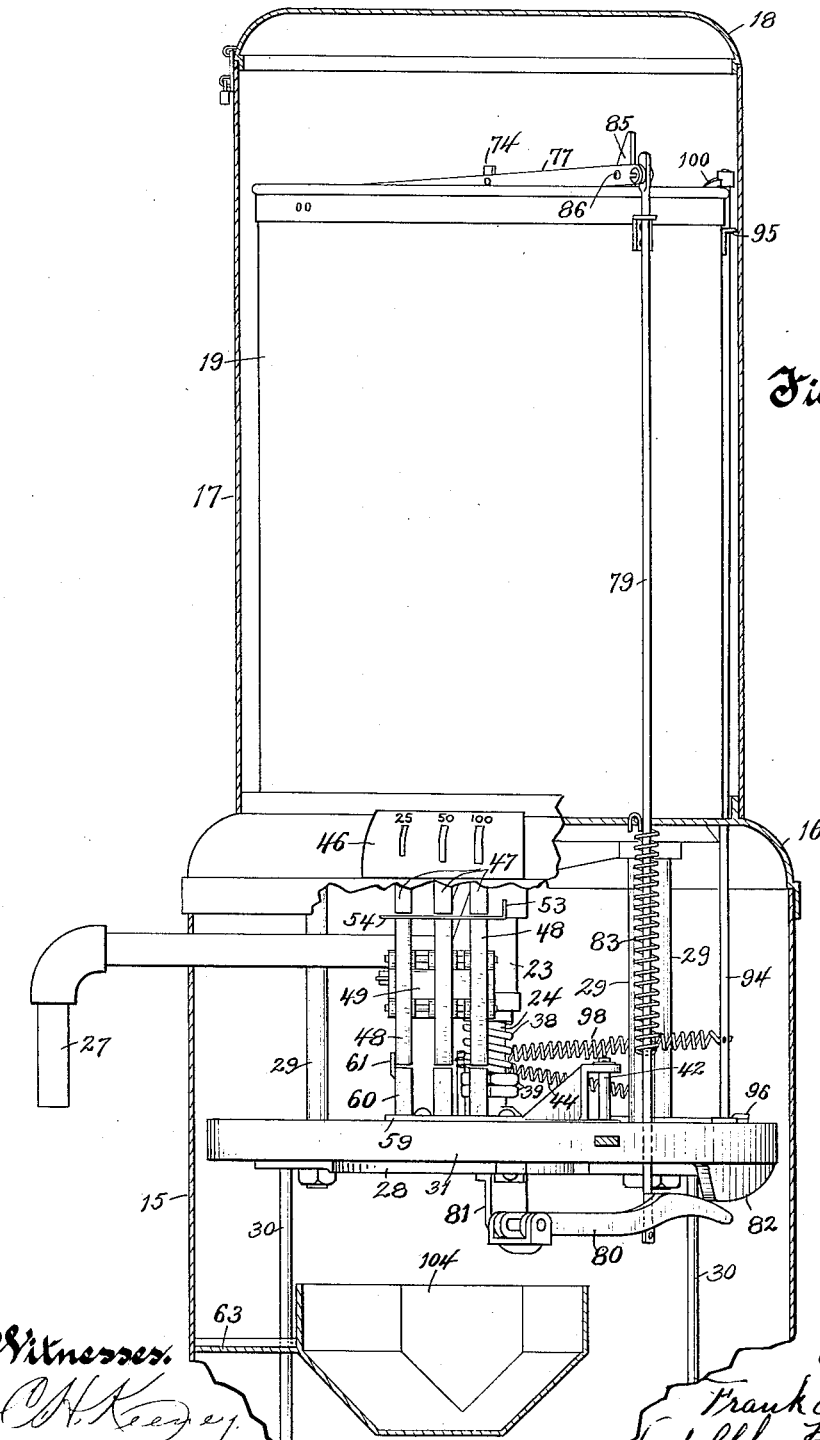
Figure 4:
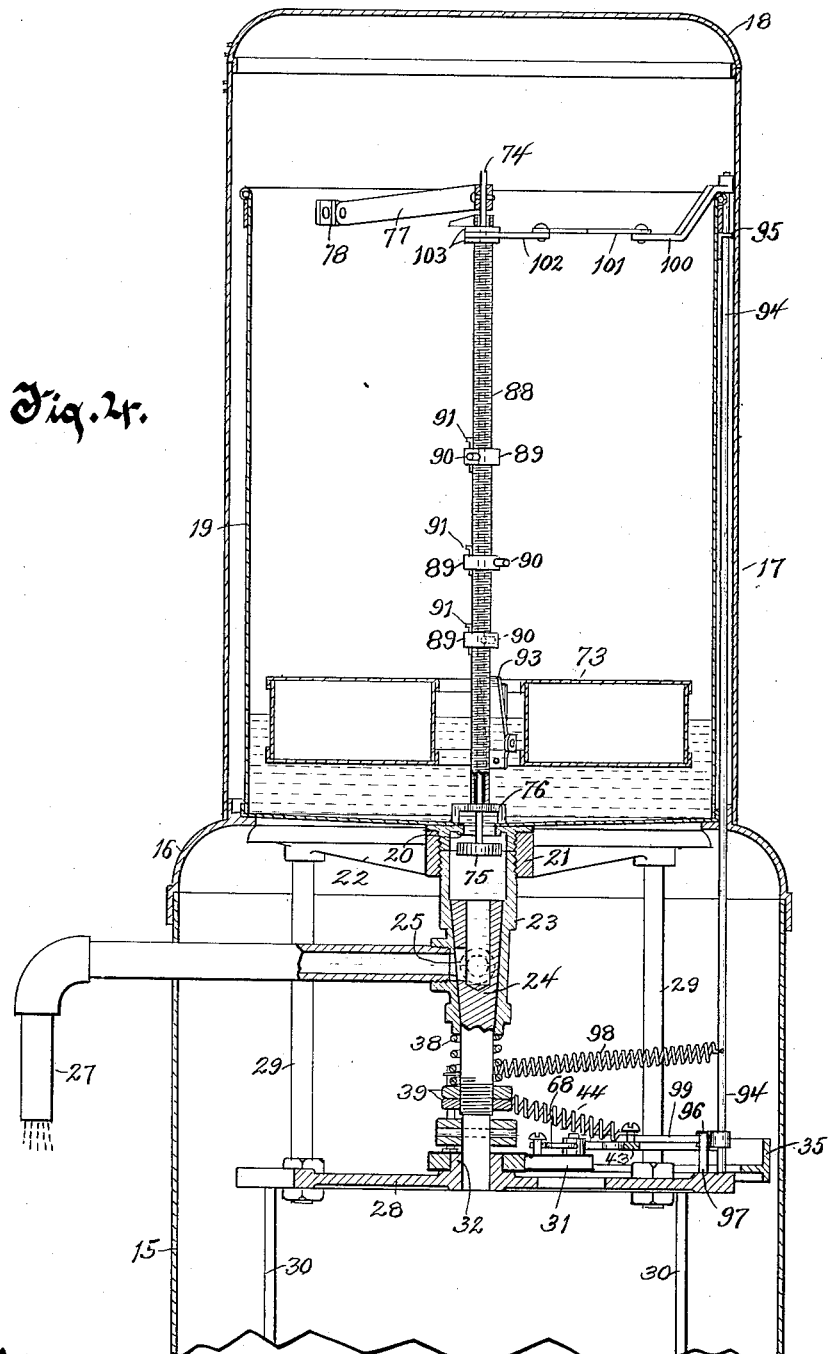
Figure 5:
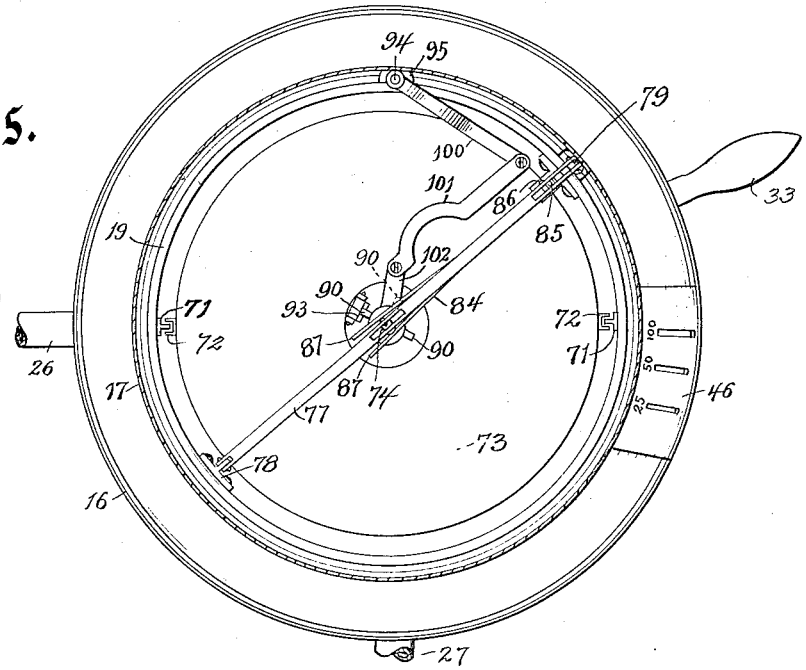
Figure 7:
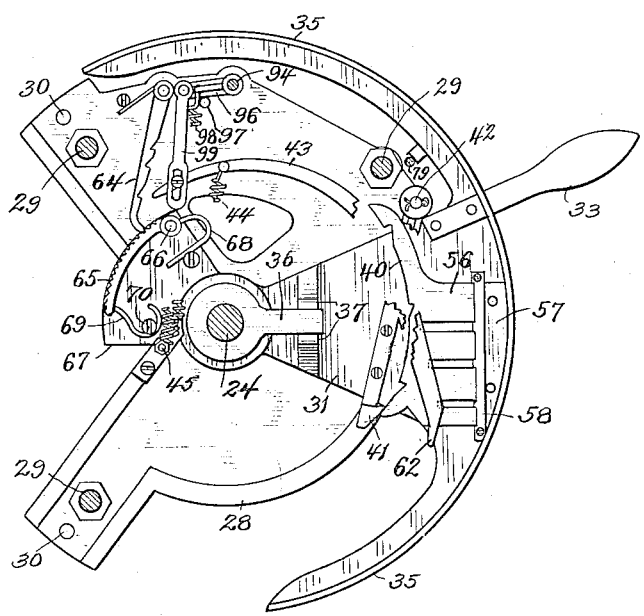
Figure 8:
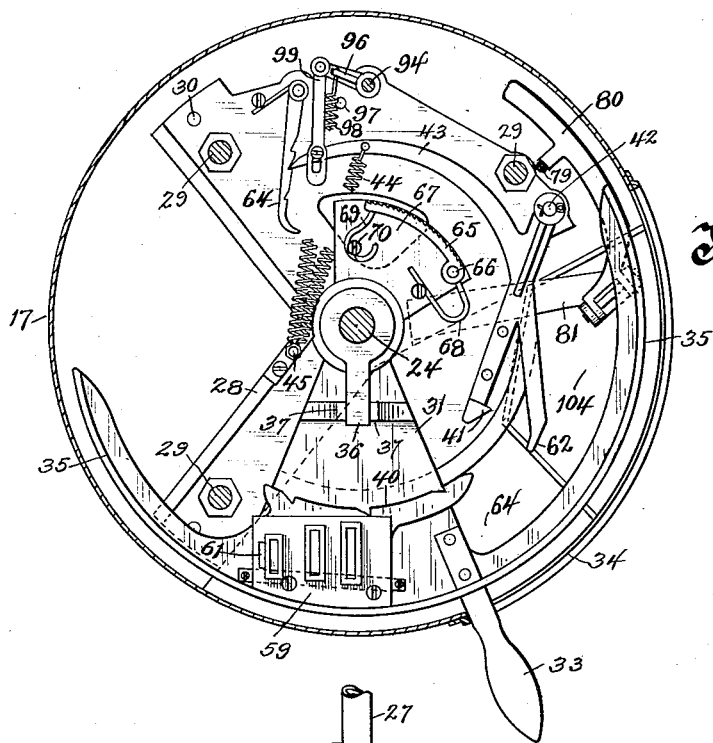
Figure 9:
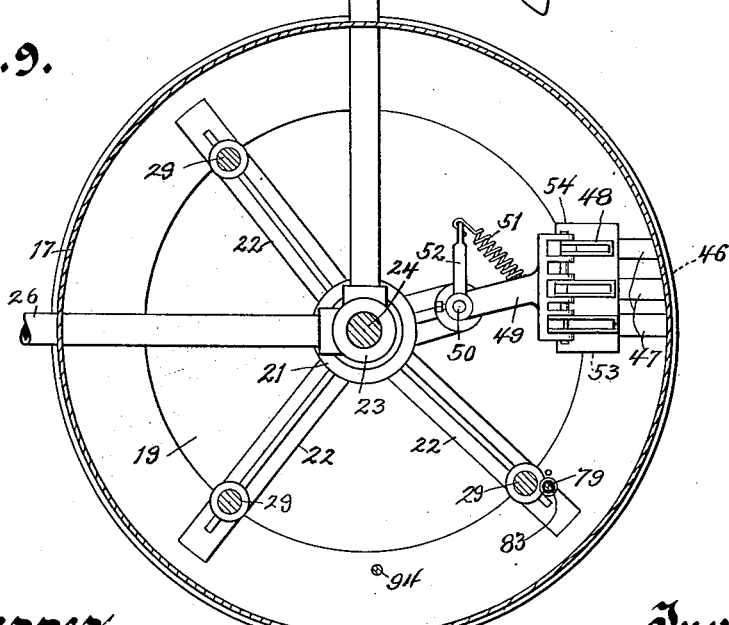
Figure 10:
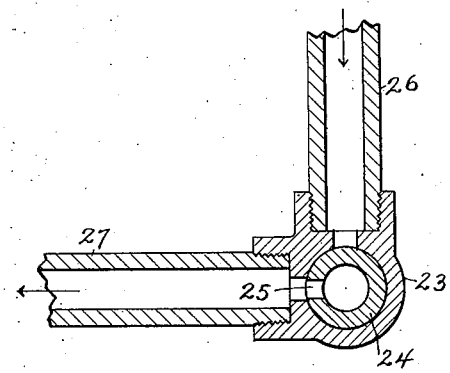
Figure 11:
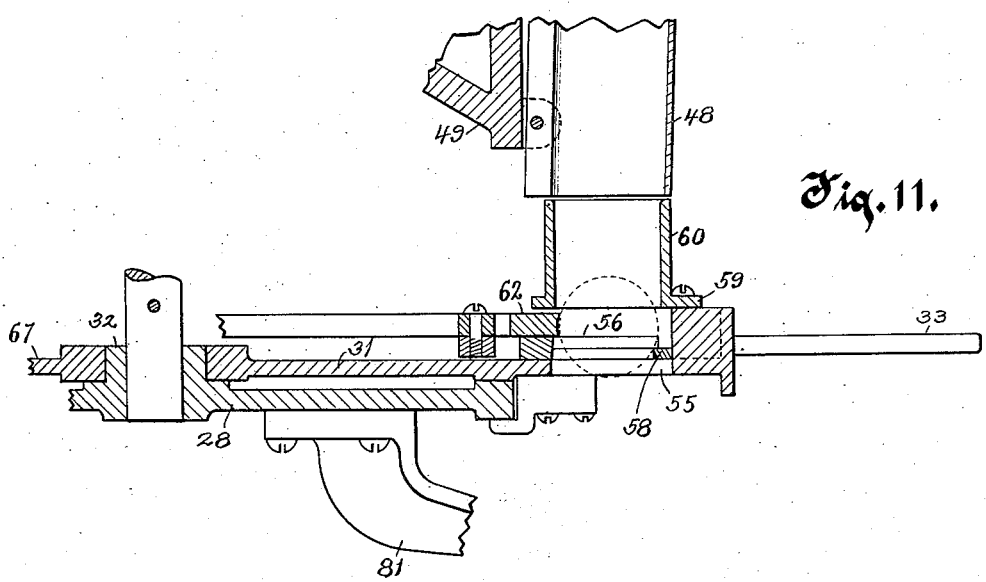
Figure 12:
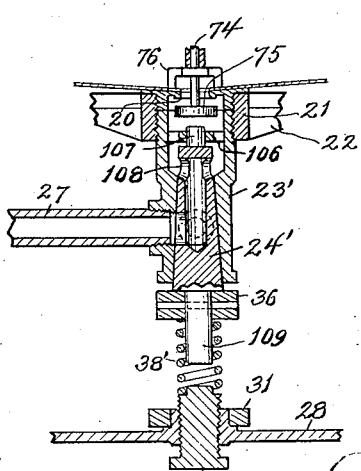

Figure 1 is a front elevation of a liquid vending machine constructed in accordance with this invention; Fig. 2 is a central vertical sectional view thereof; Fig. 3 is a similar view on a plane approximately at right angles to the sectional plane of Fig. 2, with the measuring receptacle and other parts shown in elevation; Fig. 4 is a similar view with the measuring receptacle and other parts shown in section; Fig. 5 is a sectional plan view taken on the plane of line 5—5 of Fig. 2; Fig. 6 is a similar view taken on the plane of line 6—6 of Fig. 2, showing the operating lever and other parts in their normal positions; Fig. 7 is a similar view of the operating lever and its associated parts with portions broken away for clearness of illustration; Fig. 8 is a view similar to Fig. 6, with the operating lever and its associated parts in their positions for charging the measuring receptacle; Fig. 9 is a sectional view looking upwardly from the plane of sectional line 6—6 of Fig. 2; Fig. 10 is a transverse sectional view of the charging and discharging valve of the measuring receptacle; Fig. 11 is a sectional detail view of the coin carrier and its associated parts; and, Fig. 12 is a sectional elevation of a modified form of charging and discharging valve for the measuring receptacle.

In these drawings, 15 represents a base, preferably of sheet metal and of a cylindrical form, as shown, which supports a shoulder ring 16 carrying a casing 17, also preferably cylindrical and of sheet metal construction, and provided with a removable locked cover 18.

Seated on an inwardly extending annular flange of the collar ring 16 and contained within the casing 17, is a cylindrical measuring tank or receptacle 19, having an inclined or slightly conical bottom which leads to a valve seat 20 secured therebeneath. The valve seat 20 is threaded in a hub 21 of a spider frame 22, which is preferably formed integral with the shoulder ring 16, and a conical valve casing 23 is also threaded in said hub to communicate with the interior of the measuring receptacle through the valve seat.

A tapering valve 24 with its larger end uppermost is fitted within the conical valve casing 23, and has a bore leading from its upper end to a vertical slot or port 25 in its side, which is adapted to register with a supply pipe 26 in one position for charging the measuring receptacle, and to register with a discharge pipe 27 in another position for discharging the measuring receptacle. These pipes connect with the valve casing 23 at approximately right angles, so that a quarter turn of the valve changes it from one connection to the other. The supply pipe 26 may lead from any suitable source of gasolene or other liquid supply, preferably a large storage tank located at an elevation so as to deliver the liquid under pressure, while the discharge pipe 27 terminates in an elbow at the outside of the base to discharge the gasolene into buckets or other convenient receptacles.

The control of the valve 24 is accomplished by means of a hand lever projecting through the base within reach of the operator, but this hand lever is automatically locked in its normal position by a coin released locking mechanism, and such control may only be had by the deposit of a proper coin to release the locking mechanism. The lower end or stem of the valve 24 is journaled in a frame 28 which is supported by bolts 29 connecting it with the spider 22 of the shoulder ring, and also by bolts 30 connecting it with the bottom casting of the base 15.

The operating lever comprises a sector-shaped member 31, which is journaled around the stem of valve 24 on a boss 32 of frame 28, and a handle member 33 which connects therewith and projects through a horizontal slot 34 in the base 15, there being arc-shaped extensions 35 on each side of the member 31 to cover the slot 34 in all positions of the lever. A crank lug 36 is rigidly fastened on the stem of valve 24, preferably by having a pin driven therethrough, and extends between a pair of parallel engaging lugs 37 on member 31 of the operating lever, thus locking the operating lever with the valve.

The object in forming the connection between the operating lever and the valve by means of the crank lug 36 and the engaging lugs 37 is to enable the valve to have slight vertical movement independent of the operating lever, in order that it may make a firm seat within the valve casing under spring pressure, there being a coil compression spring 38 surrounding the stem of the valve and bearing at its upper end on the valve casing and at its lower end on a pair of jam nuts 29 threaded on the valve stem to provide the necessary pressure for this purpose. The valve may thus be caused to have the pressure on its seat adjusted to the desired degree by changing the position of the jam nuts 39, and will always take up the wear and prevent leakage.

As shown in Fig. 7, the sector-shaped member 31 of the operating lever has secured to it, or formed thereon, an arc-shaped rack 40 provided with a series of notches to be engaged by a locking pawl 41, which is pivoted at 42 on the stationary frame 28 and has a long curved tail 43 connected with a spring 44 which extends from a post 45 on the frame 28 so as to give the locking pawl a tendency to swing outwardly into engagement with the notches of the rack 40. An attempt to move the operating handle 33 from the position at the right of the slot, as shown in Fig. 6, will be prevented by the dog 41 riding into the first notch of the rack 40, unless said dog is held against the action of its spring 44 by a coin, as will now be described. A coin slot plate 46 is mounted on the shoulder ring 16 and has inclined chutes 47 leading inwardly from its several coin slots. At their lower ends the chutes communicate with vertical connecting tubes 48, as shown in Figs. 2 and 3, which are carried by a swinging bracket 49 mounted on a stud 50 of spider 22. The bracket is given a tendency to move and carry the tubes 48 out of register with the chutes 47 by a spring 51 connecting it with an adjustable set arm 52 on the lower end of stud 50, such movement being limited by the engagement with the first chute of the upturned end 53 of a plate 54 carried by the upper ends of tubes 48.

When the upturned end 53 of the plate 54 is in engagement with the first inclined chute 47, said plate closes the lower ends of the inclined chutes so that coins which are placed in the slots at such time will be held by the plate 54 until the bracket 49 is swung against the action of its spring 51 to bring the tubes 48 into register with the inclined chutes.

A coin carrier is formed on the operating lever at a point where the sector-shaped member 31 is provided with a series of slots 55, one of which is seen in Fig. 11, there being corresponding registering slots extending inwardly from the outer edge of the flat plate 56, which forms the arc-shaped rack 40 before mentioned, through which slots the coins are discharged from the coin carriers.

There is a block 57 or enlarged integral portion of the sector-shaped member 31 near its outer edge which extends along the alined outer edges of the several slots referred to, and at its edge is a narrow strip 58 to form a shoulder limiting the effective length of the coin slots of plate 56. A plate 59 is secured to the block or enlargement 57 and has upstanding tube sections 60, which register with the slots in the plate 56 and in the section 31 of the operating lever, and are adapted to be brought into register with the tubes 48, there being a projection 61 on the last tube section 60 to engage the lower edge of the last tube 48 while the operating lever is being swung to the right, so as to swing the bracket 49 with the tubes 48 against the action of spring 51 and into register with the inclined chutes 47, as clearly shown in Fig. 3. When the operating lever is moved to the left, however, the spring 51 causes the bracket to swing with the tubes 48 along with the operating lever until the projection 53 engages the first inclined chute 47, and there the tubes 48 remain during the remainder of the movements of the operating lever until the projection 61 again engages the last tube 48 and returns it to its normal position.

The locking pawl 41, which is preferably provided with a removable engaging nose for engaging the notches of the rack 40, has a projecting arm 62 which passes between the plate 59 and the plate 56 of the coin carrier and is adapted to ride its grooved or concaved outer edge against the edge of a coin which may be located in any one of the slots of these plates. The coin is supported by engaging this edge of the arm 62 and the edge of the strip 58, as shown in Fig. 11, while the operating lever is moving to the left and until said coin is carried beyond the end of the arm 62, when it is released and permitted to drop through the registering openings into a till or money receptacle 63 below.

The arm 62 is so positioned that the movements of the coins thereagainst act upon it as a cam and cause it to swing the locking pawl against the action of spring 44, this movement varying with the size of the coin and serving to carry the locking pawl away from the rack 40, so as to unlock the operating lever and permit it to continue in its operating stroke, and also serving to adjust a liquid measuring mechanism in the measuring tank or receptacle to be later described. As the swinging lever which has been termed the locking pawl, besides serving the function implied by that name, has the further function of adjusting the measuring device, it will be referred to as a locking pawl or a gage adjusting lever, according to circumstances.

The openings in the slot plate 46 may be of any number or suitable for coins of any size desirable, but they are preferred as here shown, where three slots are provided and marked for the different values of the coins for which they are intended, a quarter-dollar, a half-dollar, and one dollar, the slots being in the order named from left to right. Any one of the coins mentioned, on being placed in the proper slot and delivered to the coin carrier by bringing the tube sections 60 and the tubes 48 into register with the inclined chutes 47 by the movement of the operating lever to its extreme position to the right, will, during the preliminary movement of the operating lever, which is a movement sufficient to bring the locking pawl 41 opposite the first notch in the rack 40, cause the arm 62 to swing sufficiently to withdraw the locking pawl 41 from the rack 40 and permit the continued movement of the operating lever. The smallest coin accomplishes no further movement of the arm 62, but the other coins cause the arm 62 to swing to an extent proportional to their size, and the gage adjusting lever is retained in the position to which it is moved by the coin by means of a detent 64 which is pivoted on the frame 28 and is spring pressed to engage the pointed tail end 43 of the gage adjusting lever by one of its three notches.

The detent 64 has its curved pointed free end engaging an arc-shaped rack 65, which is pivoted at 66 on a sector shaped extension 67 of the operating lever, and is pressed outwardly by means of a spring 68, being limited in its outward movement by a stop hook 69 thereon engaging a pin 70 on the projection 67. The pointed end of the detent 64 is so blunt that it is capable of riding over the teeth of rack 65 in either direction, and while normally held out of engagement with the end of the gage adjusting lever, during the preliminary movement of the operating lever it is moved by the rack into engagement with the end of the gage adjusting lever at its first notch, and will serve to hold said gage adjusting lever by such engagement during the remainder of the operating stroke of the operating lever and until the return stroke thereof. The gage adjusting lever is held by the first notch of the detent if it has been swung by the smallest coin, and by the second notch of the detent if it has been swung by the intermediate sized coin, and by the last notch of the detent if it has been swung by the largest coin, these engagements being all permitted during the time the rack 56 is riding against the end of the detent and assisting in accomplishing them.

During the preliminary movement of the operating lever the detent causes the rack 65 to swing against the action of its spring 68 and throughout the remainder of the engagement of the rack with the detent the rack is swung inwardly, so that as soon as it passes beyond the detent its spring throws it outwardly to its normal position, as shown in Fig. 8, where it will positively engage the end of the detent during the return stroke of the operating lever, to disengage the detent from the gage adjusting lever and permit the spring 44 to return said gage adjusting lever to its normal position, so that the locking pawl may ride on the rack 40 and by its engagement with the successive notches thereof prevent a return of the operating lever to the left position and require it to be restored to its original position at the right. During the engagement of the rack 65 with the detent, on the movement of the operating lever to the left, a reversal in direction of movement of the operating lever will cause the rack to swing the detent 65 out of engagement with the gage adjusting lever and permit the locking pawl 41 to engage the rack 40 and require the lever to be restored to its normal position, thus preventing tampering with the machine.

The measuring receptacle 19 is provided with guides 71 which coöperate with flanges 72 on a float 73 to guide said float in its vertical movements within the measuring receptacle and prevents its binding with the walls thereof. There is an opening through the center of the float through which extends a valve rod 74 carrying a valve 75 at its lower end for engaging the valve seat 20 before mentioned, the valve rod being guided by passing through an arched guide 76 in the bottom of the measuring receptacle and being pivotally connected at its upper end to a valve lever 77 which is pivoted at 78 to one side of the measuring receptacle and extends over the edge of the other side of the receptacle. A valve operating rod 79 is pivotally connected to the projecting end of the valve lever 77 and extends downwardly between the measuring receptacle and the casing 17 and is pivotally connected to a cam lever 80 which is mounted on a hanger bracket 81 secured to the under side of the frame. The cam lever 80 is adapted to be engaged and forced downwardly by a cam 82 on the under side of the right hand extension 35 of the operating lever. A coil spring 83 surrounds the valve operating rod 79, with one end connected to said rod and the other end connected to the inwardly extending flange of the shoulder ring 16 on which the measuring receptacle is seated. The tendency of this spring is to lift the valve operating rod and thereby close the valve 75 by swinging the valve lever 77 upwardly. When the cam 82 rides on the cam lever 80 it forces valve rod 79 to move downwardly against the action of its spring and thereby open the valve 75.

A bell crank trip lever 84 is pivotally mounted on the measuring receptacle with its upright member passing through a slot in the end of the valve lever 77 and provided with a tapering cam nose 85 to form a catch for engaging a pin 86 extending across said slot. The longer horizontal member of the bell crank lever is provided with a pair of arms 87 embracing the valve rod 74 and adapted to be engaged and lifted by a float controlled gage tube 88 which surrounds the valve rod and normally rests upon the guide 76 at the bottom of the measuring receptacle.

The gage tube 88 has screw threads for its entire length and stop nuts 89 are threaded thereon, being provided with outwardly extending stop pins 90, and being locked in their adjustments on the gage tube by keys 91 fitting in a key way 92 extending longitudinally of the gage tube. The stop pins 90 on the stop nuts extend in different directions, and beneath the lowest stop pin there is a spring pressed catch 93 pivoted to the wall of the central opening through the plate 73, so that in the normal position of the gage tube the catch 93 will engage the first stop pin 90 and thereby lift the gage tube and cause the bell crank lever 84 to swing and release the valve lever 77 and permit the spring 83 to move the valve rod 89 to close the valve 75. This is the action of the measuring device when the machine is operated with the smallest coin, but when the larger coins are used the gage tube is caused to turn to an extent that will carry the lowest stop pin 90 out of the path of catch 93 and present one of the other stop pins in its path, to cause the release of valve lever 77 after a greater quantity of liquid has been admitted to the measuring receptacle.

A rock shaft 94 extends upwardly from frame 28 and between the measuring receptacle 19 and the casing 17, being journaled in the frame 28 and a bracket 95 near the upper end of the measuring receptacle, and at its lower end it has a crank arm 96 which is pulled against a stop 97 on the frame by a spring 98 connected with the stud 45 before mentioned. A link 99 connects the end of the crank arm 96 with the end of the tail 43 of the gage adjusting lever, being provided with an elongated slot riding on a pin of the tail member 43, so as to permit a slight movement of the gage adjusting lever without affecting the rock shaft 94, this being the movement which is produced by the operation of the smallest coin. The degree of movement of the gage adjusting lever produced by the larger coins, however, causes the rock shaft 94 to turn to a greater or less extent. At the upper end of rock shaft 94 is a crank arm 100 which is connected by means of a link 101 with a crank arm 102 secured to the gage tube 88 between a pair of nuts 103. By this means the shorter movement of the gage adjusting lever produced by the operation of the machine with the smallest coin does not effect a change in position of the gage tube, but the greater movements of the gage adjusting lever caused by the operation of the machine with the larger coins causes the rock shaft 94 to turn and swing crank arm 100 so as to cause a turning movement of the gage tube to present that stop pin 90 to the path of catch 93 which corresponds with the size of the coin used, the middle stop pin being moved to the path of catch 93 when the intermediate size coin is used and the upper stop pin being moved to such position when the largest coin is used. The link 101 is curved to permit its full desired movement without engaging the gage tube and the catch 93 is pivoted and spring pressed to permit of its passing by the stop pins on the downward movement of the float.

In operation, a coin is dropped in the slot of plate 46 and passes through the inclined chute 47 and the tube 48 to the tube section 60 therebeneath, if the operating lever is in its extreme right position. If the operating lever is not in its extreme right position, the coin will be arrested by the plate 54 until the operating lever is moved to such position. When lowered into the tube section 60 the coin rests upon the narrow metal strip 58 on one side and on the grooved edge of the locking pawl on the other side and is held by these two bearings against falling through the slots into the space beneath. If the coin is smaller than the intended coin, it is not capable of resting on these two bearings, but passes on through and is dropped into a receptacle or pocket 104, from which it may be removed by the customer through an opening 105 in the base of the machine. If the coin is larger than the coin intended it will not be capable of entry through the slot in plate 46. With the proper coin held by the two bearings, 58 and 62, the preliminary movement of the operating lever, which is that allowed before the first notch of rack 40 is brought to a position where it may be engaged by locking pawl 41, causes the coin to travel on the cam surface of arm 62 a sufficient extent to force the locking pawl 41 inwardly out of the way of rack 40, so that the operating lever becomes unlocked and is free to continue the remainder of its movement to the left. The coin will be carried by the coin holder until it reaches the end of arm 62, when it is released and permitted to drop into the till 63 below, having in the meantime acted upon the arm 62 to cause the gage adjusting lever to swing to a degree which will turn the rock shaft 94 and the gage tube 88 to an extent that will bring the stop pin 90 which corresponds to the coin employed into the path of catch 92. The degree of movement of the catch adjusting lever produced by the smallest coin is not sufficient to change the position of gage tube 88, owing to the play allowed by the connection between this lever and link 99, but the intermediate size coin will cause the gage tube to turn to a position to bring the middle stop pin 90 in the path of catch 93, and the largest size coin will turn the gage tube to present the upper stop pin 90 to the path of said catch. The engagement of the detent with the gage adjusting lever locks the latter in its adjustment until the liquid has been measured.

Having adjusted the gage by means of the coin and deposited the coin in the till, the continued movement of the operating lever which is permitted by the locking pawl being held by the detent, brings the port 25 of valve 24 into register with the supply pipe 26, so that gasolene may enter the measuring receptacle through said valve, the valve 75 being in the meantime held in its normally open position as before described. The gasolene will continue to flow into the measuring receptacle, lifting the float 73 until the catch 93 engages the stop pin 90 which stands in its path, and then lifts the gage tube 98 to swing the trip lever 84 and release valve lever 77, which permits spring 83 to forcibly lift the valve rod 79 and close the valve 75, preventing a further inflow of gasolene. This sudden operation of the automatically released parts is accompanied by a sound which indicates to the customer that the gasolene has been measured, and he then moves the operating lever to the right. Rack 65 then engages the detent 64 and swings it out of engagement with the tail of the locking pawl, so that the gage tube is restored to its normal position and the locking pawl springs back into engagement with rack 40 and prevents a change in direction of movement of the operating lever until the lever has been returned to its original position, where it is again locked thereby. In the meantime valve 24 has been turned so that its port 25 registers with the discharge pipe 27 and the valve 75 has been forced open by the cam 82 riding on the cam lever 80 and pulling down on the valve rod 79, thus allowing the free discharge of the gasolene with all parts restored to their original positions. Besides returning to the customer such coins as are of insufficient size to produce the operation of the machine, if coins are placed in two slots at the same time the larger coin will swing the arm 62 so as to release the smaller coin before the latter reaches the end of arm 62 and thereby cause said smaller coin to drop into the pocket 104, while the larger coin proceeds with its operation of adjusting the gage and is dropped into the till 63 as usual. The machine is finally locked with the valve 24 in its discharge position, so that all gasolene is drained therefrom and the arrangement of this valve is such that it is firmly held on its seat by the spring 38 to prevent leakage of gasolene even after wear of the parts, for the connections are such as to compensate for wear.

In Fig. 12 of the drawing there is shown a modification of this valve wherein the valve is tapered upwardly instead of downwardly, so that it may be removed from beneath instead of requiring the valve casing to be removed with it. In this construction the valve 24' fits within the casing 23' corresponding to the casing 23, except for the direction of taper of the valve seat, having a bridge piece 106 across the valve chamber with a stud 107 on the end of the valve and journaled therein, the valve being provided with a central bore with upper openings 108 on one side instead of the upper end. The valve 24' also has a stem 109 to which the lug 36 is locked as before, though this stem is not journaled in the base 28 but has a coil spring 38' surrounding it and bearing on an adjusting screw 39' which is threaded in the base and is adapted to vary the pressure of spring 38' with which the valve is held on its seat.

A machine constructed in accordance with this invention is adapted to automatically measure liquid accurately and deliver the proper quantity for which the coin has been deposited, the adjustment of the stop nuts 89 on the gage tube permitting the dealer to vary the quantities delivered to correspond with the fluctuation in the price of gasolene.

This machine is proof against false operation, causing a release of the gage setting mechanism and the locking pawl in event of an attempt to return the operating lever to its original position before completing its movement to the left and automatically releasing and restoring the gage setting mechanism and the locking pawl during the return movement of the operating lever, to prevent an attempt at interfering with the operation of the machine with the object of securing more gasolene than is intended to be delivered for the coin deposited. On the other hand, an improper coin which is capable of being admitted through the slots of the machine is delivered to the operator without unlocking the operating lever, and when more than one coin is deposited the smaller coin is returned to the operator, and if coins are deposited when the machine is not in position to receive them they are detained by the plate 54 until the machine is brought to the proper position.

What we claim as our invention is:

1. A liquid vending machine, comprising a measuring receptacle, a valve controlling mechanism therefor, coin released locking means for the valve controlling mechanism adapted to receive coins of different value, and an automatic measuring device adapted to stop the inflow of liquid to the measuring receptacle when a predetermined quantity of liquid has been delivered to said measuring receptacle and adjusted by means of the coins to vary the time for closing the inflow of liquid to the measuring receptacle and proportion the quantity of liquid measured to the value of the coin deposited.

2. A liquid vending machine, comprising a measuring receptacle, a valve controlling mechanism therefor, coin released locking means for the controlling mechanism adapted to receive coins of different value, a float in the measuring receptacle, and means to be engaged by the float at different elevations for automatically stopping the inflow of liquid to the receptacle, said means being adjusted by the coins to proportion the quantity of liquid measured to the value of the coin.

3. A liquid vending machine, comprising a measuring receptacle, a valve controlling mechanism therefor, coin released locking means for the controlling mechanism adapted to receive coins of different value, a float in the measuring receptacle, and a plurality of stops adapted to be moved into the path of the float to be engaged thereby for stopping the inflow of liquid to the measuring receptacle, said stops being movable by the coins so as to proportion the quantity of liquid measured to the value of the coins.

4. A liquid vending machine, comprising a measuring receptacle, a valve controlling mechanism therefor, coin released locking means for the controlling mechanism adapted to receive coins of different value, a float in the measuring receptacle, a catch on the float, a rotatable member, stops on the rotatable member to be engaged by the catch in different positions of the rotatable member, a valve controlled by the rotatable member for stopping the inflow of liquid to the measuring receptacle when the catch engages one of the stops, and means for turning the rotary member actuated by the coins, whereby the amount of liquid measured in the measuring receptacle when the catch engages a stop will be proportionate to the value of the coin with which the machine is operated.

5. A liquid vending machine, comprising a measuring receptacle, a valve controlling mechanism therefor, a coin released locking means for the controlling mechanism adapted to receive coins of different value, a float in the measuring receptacle, a catch on the float, a rotatable member, stops on the rotatable member to be engaged by the catch in different positions of the rotatable member, a valve for stopping the inflow of liquid to the measuring receptacle, means for operating the valve released by the movement of the rotatable member when the catch engages one of the stops, and means for turning the rotatable member by the coin deposited, whereby the quantity of liquid measured at the time the catch engages the stop is proportionate to the value of the coin deposited.

6. A liquid vending machine, comprising a measuring receptacle, a valve controlling mechanism therefor, coin released locking means for the controlling mechanism adapted to receive coins of different value, a float in the measuring receptacle, a catch on the float, a rotatable member, stops on the rotatable member to be engaged by the catch in different positions of the rotatable member, a valve for stopping the inflow of liquid to the measuring receptacle, spring actuated means for operating the valve, a catch for locking the valve operating means in the open position of the valve and released by the movements of the rotatable member when the catch engages a stop, and means for turning the rotatable member to an extent depending upon the size of the coin deposited, whereby the quantity of liquid measured in the measuring receptacle will be proportionate to the value of the coin deposited.

7. A liquid vending machine, comprising a measuring receptacle, a valve controlling mechanism therefor, coin released locking means for the valve controlling mechanism adapted to receive coins of different value, a float in the measuring receptacle, a catch on the float, a rotatable member, stops on the rotatable member to be engaged by the catch in different positions of the rotatable member, a valve for stopping the inflow of liquid to the measuring receptacle, spring actuated means for operating the valve, a catch for locking the valve operating means in the open position of the valve and released by the movements of the rotatable member when the catch engages a stop, means for turning the rotatable member to an extent depending upon the size of the coin deposited, whereby the quantity of liquid measured in the measuring receptacle will be proportionate to the value of the coin deposited, and means for opening the valve to discharge the measured liquid and for resetting the catch.

8. A liquid vending machine, comprising a measuring receptacle, a valve controlling mechanism therefor, coin released locking means for the valve controlling mechanism adapted to receive coins of different value, a float in the measuring receptacle, a catch on the float, a gage tube in the measuring receptacle, stop nuts threaded thereon and having projections extending in different directions, said gage tube being adapted to be turned to present the stop projections in the path of the catch for causing the gage tube to rise with the float, a valve for stopping the inflow of liquid to the measuring receptacle, a valve rod carrying the valve and passing through the gage tube, a spring actuated valve lever connected with the valve rod, and a catch for engaging the valve rod and adapted to be tripped by the upward movement of the gage tube.

9. A liquid vending machine, comprising a measuring receptacle, a valve controlling means therefor, a coin released locking mechanism for the valve controlling means adapted to receive coins of different value, a float in the measuring receptacle, guides for the float, a spring catch on the float, a valve for stopping the inflow of liquid to the measuring receptacle, a valve rod connected with the valve and passing through an opening in the float, a valve lever pivotally mounted on the measuring receptacle and connected with the valve rod, a cam lever, a cam on the valve controlling means for moving the cam lever, a spring actuated valve operating rod connecting the cam lever with the valve lever, a gage tube surrounding the valve rod, stop nuts threaded on the gage tube, stop pins on the stop nuts extending in different directions and adapted to be brought into the path of the catch on the float, keys for locking the stop nuts on the gage tube in their adjusted positions, a bell crank latch lever pivotally mounted on the measuring receptacle and adapted to engage the valve lever, arms on the bell crank latch lever bearing on the gage tube so that an upward movement of the gage tube releases the valve lever, a crank arm on the gage tube, a rock shaft, a crank arm on the rock shaft, a link connecting the crank arm of the rock shaft with the crank arm of the gage tube, and means coöperating with the valve controlling means for turning the rock shaft more or less according to the size of the coin deposited, whereby the gage tube is caused to turn and present one stop pin or another to the path of the catch on the float and permit a quantity of liquid to enter the measuring receptacle proportionate to the value of the coin deposited before the valve is closed.

10. A liquid vending mechine, comprising a measuring receptacle, a valve controlling means therefor, coin released locking mechanism for the valve controlling means adapted to receive coins of different value, an adjustable gage for stopping the inflow of liquid to the measuring receptacle at predetermined points, and a gage adjusting lever located in the path of the coins so as to be moved thereby more or less according to the size of the coins and vary the quantity of liquid measured proportionately to the value of the coin deposited.

11. A liquid vending machine, comprising a measuring receptacle, a valve controlling means therefor, an adjustable gage for stopping the inflow of liquid to the measuring receptacle at predetermined points, a gage adjusting lever located in the path of the coin so as to be moved thereby more or less according to the size of the coin and vary the quantity of liquid measured according to the value of the coin deposited, and a locking pawl carried by the gage adjusting lever and adapted to engage and lock the valve controlling means and to be disengaged therefrom by the action of the coin on the gage adjusting lever.

12. A liquid vending machine, comprising a measuring receptacle, a valve controlling means therefor, an adjustable gage for stopping the inflow of liquid to the measuring receptacle at predetermined points, a gage adjusting lever located in the path of the coin so as to be moved thereby more or less according to the size of the coin and vary the quantity of liquid measured according to the value of the coin deposited, a locking pawl carried by the gage adjusting lever, a rack on the valve controlling means to be engaged by the locking pawl for locking the valve controlling means, and means for holding the gage adjusting lever in its adjusted positions during the movement of the valve controlling means in one direction and adapted to release said lever during the movement of the valve controlling means in the other direction.

13. A liquid vending machine, comprising a measuring receptacle, a valve controlling means therefor, an adjustable gage for stopping the inflow of liquid to the measuring receptacle at predetermined points, a gage adjusting lever located in the path of the coin so as to be moved thereby more or less according to the size of the coin and vary the quantity of liquid measured according to the value of the coin deposited, a locking pawl carried by the gage adjusting lever and adapted to engage the valve controlling means for locking it, and means for retaining the gage adjusting lever in the positions to which it is moved by the coins during the movement of the valve controlling means in one direction and adapted to be released during the movement of the valve controlling means in the other direction.

14. A liquid vending machine, comprising a measuring receptacle, a valve controlling means therefor, an adjustable gage for stopping the inflow of liquid to the measuring receptacle at predetermined points, a gage adjusting lever located in the path of the coin so as to be moved thereby more or less according to the size of the coin and vary the quantity of liquid measured according to the value of the coin deposited, a locking pawl carried by the gage adjusting lever and adapted to engage the valve controlling means for locking it, a spring pressed detent for engaging the gage adjusting lever and holding it in the positions to which it is moved by the coins during the movements of the valve controlling means in one direction, and a spring pressed pawl for releasing the detent during the movement of the valve controlling means in the other direction.

15. A liquid vending machine, comprising a measuring receptacle, a valve controlling means therefor, an adjustable gage for stopping the inflow of liquid to the measuring receptacle at predetermined points, a gage adjusting lever located in the path of the coin so as to be moved thereby more or less according to the size of the coin and vary the quantity of liquid measured according to the value of the coin deposited, a locking pawl carried by the gage adjusting lever and adapted to engage the valve controlling means for locking it, a spring pressed detent for engaging the gage adjusting lever and holding it in the positions to which it is moved by the coins, a spring pressed rack carried by the valve controlling means and engaging the detent and adapted to disengage the detent from the gage adjusting lever when the valve controlling means is moved backward.

16. A liquid vending machine, comprising a measuring receptacle, a valve controlling means therefor, an adjustable gage for stopping the inflow of liquid to the measuring receptacle at predetermined points, a gage adjusting lever located in the path of the coin so as to be moved thereby more or less according to the size of the coin and vary the quantity of liquid measured according to the value of the coin deposited, the connection between the adjustable gage and the gage adjusting lever comprising a spring actuated rock shaft with a crank thereon and a link connecting the crank with the gage adjusting lever, a locking pawl carried by the gage adjusting lever and adapted to engage the valve controlling means for locking it, a spring pressed detent for engaging the gage adjusting lever and holding it in the positions to which it is moved by the coins during the movements of the valve controlling means in one direction, and a spring pressed rack carried by the valve controlling means and engaging the detent and adapted to disengage the detent from the gage adjusting lever when the valve controlling means is moved in the other direction.

17. In a coin controlled mechanism, a chute adapted to receive a coin, a spring actuated swinging bracket, a tube carried thereby adapted to register with the chute and receive the coin therefrom, a plate carried by the tube to close the end of the chute and detain the coin therein when the tube is out of register with the chute, a stop on the plate for engaging the chute and limiting the movement of the tube, and a movable coin carrier adapted to engage the tube and move it into register with the chute and receive the coin therefrom.

In testimony whereof, we affix our signatures, in presence of two witnesses.

ADOLPHUS H. SAGE.
FRANK E. MITCHELL.

Witnesses:
W. C. HEWITT,
VINCENT C. POOR.